(12) United States Patent
Hou et al.

(10) Patent No.: US 12,542,878 B2
(45) Date of Patent: Feb. 3, 2026

(54) SPLICING PROJECTION DEVICE AND METHOD BASED ON REFLECTIVE LIQUID CRYSTAL IMAGE MODULATOR

(71) Applicant: Shenzhen Sunshine Laser & Electronics Technology Co., Ltd., Guangdong (CN)

(72) Inventors: Ruohong Hou, Guangdong (CN); Jianli Ma, Guangdong (CN); Dong Wang, Guangdong (CN)

(73) Assignee: Shenzhen Sunshine Laser & Electronics Technology Co., Ltd., Shenzhen (CN)

( * ) Notice: Subject to any disclaimer, the term of this patent is extended or adjusted under 35 U.S.C. 154(b) by 403 days.

(21) Appl. No.: 18/371,604

(22) Filed: Sep. 22, 2023

(65) Prior Publication Data

US 2024/0015270 A1    Jan. 11, 2024

Related U.S. Application Data

(63) Continuation of application No. PCT/CN2021/098678, filed on Jun. 7, 2021.

(30) Foreign Application Priority Data

Mar. 31, 2021 (CN) .......................... 202110348376.1

(51) Int. Cl.
*H04N 9/31* (2006.01)
*G02B 27/28* (2006.01)

(52) U.S. Cl.
CPC ......... *H04N 9/3126* (2013.01); *G02B 27/283* (2013.01); *H04N 9/3147* (2013.01)

(58) Field of Classification Search
CPC .... H04N 9/315; H04N 9/3105; H04N 9/3126; H04N 9/3138; H04N 9/3141;
(Continued)

(56) References Cited

U.S. PATENT DOCUMENTS

2003/0063226 A1    4/2003  Gibbon et al.
2006/0007539 A1*   1/2006  Mihalakis .............. H04N 9/315
                                                         348/E9.027
(Continued)

FOREIGN PATENT DOCUMENTS

CN       1910908 A      2/2007
CN     107783307 A      3/2018
(Continued)

OTHER PUBLICATIONS

International Search Report of PCT Patent Application No. PCT/CN2021/098678 issued on Dec. 31, 2021.

*Primary Examiner* — Sultan Chowdhury

(57) ABSTRACT

A splicing projection device and method based on a reflective liquid crystal image modulator. In the splicing projection device based on a reflective liquid crystal image modulator, four parallel image lights modulated by first to fourth LCOS chips are formed through optical path designs of one or two light sources, one or two common beam splitting prisms, first to second polarization beam splitting prisms, first to fourth LCOS chips and an imaging lens. A whole image is spliced on a projection plane. The optical path design of the splicing projection device avoids the problem of adding a reflector during the splicing process with respect to the prior art. It can not only realize the parallel image splicing of four chips, but also simplify the optical path structure, and avoid introducing many plane surface errors, and bring great convenience for image splicing adjustment.

11 Claims, 4 Drawing Sheets

(58) Field of Classification Search
CPC .. H04N 9/3147; H04N 9/3152; H04N 9/3155; H04N 9/3161; H04N 9/3164; H04N 9/3167; H04N 9/3188; H04N 9/3197; G02B 27/09; G02B 27/10; G02B 27/18; G02B 27/0922; G02B 27/141; G02B 27/149; G02B 27/283; G02B 27/1026; G03B 21/005; G03B 21/006; G03B 21/008; G03B 21/28; G03B 21/145; G03B 21/208; G03B 21/2013; G03B 21/2033; G03B 21/2053; G03B 21/2066
See application file for complete search history.

(56) References Cited

U.S. PATENT DOCUMENTS

2009/0207379 A1* 8/2009 Oakley ............... G03B 21/208
359/485.06
2014/0055754 A1* 2/2014 Chuang ............. G03B 21/2073
353/20

FOREIGN PATENT DOCUMENTS

| CN | 108663886 A | 10/2018 |
|----|-------------|---------|
| CN | 110244516 A | 9/2019 |
| CN | 214540359 U | 10/2021 |

* cited by examiner

SPLICING PROJECTION DEVICE AND METHOD BASED ON REFLECTIVE LIQUID CRYSTAL IMAGE MODULATOR

CROSS REFERENCE TO RELATED APPLICATIONS

This application is a continuation application of PCT/CN2021/098678 filed on Jun. 7, 2021, which claims priority to CN patent application NO. 202110348376.1 filed on Mar. 31, 2021. The contents of the above-mentioned application are all hereby incorporated by reference.

TECHNICAL FIELD

The present invention relates to projection technology, more particularly to a splicing projection device and method based on a reflective liquid crystal image modulator (LCOS chip).

BACKGROUND ART

As important image modulation components, LCOS chips are widely used in projectors and exposure machines. In order to obtain a higher resolution, the patent application 201810195760.0 discloses a large field-of-view splicing type exposure machine, wherein the exposure machine uses spatial light manipulation on a modulation chip, and can realize field-of-view splicing of four LCOS chips. However, due to the large number of optical components used in the exposure machine, each sub-pattern undergoes two planar reflections. This, on the one hand, introduces more planar surface type errors, and on the other hand, with a total of 6 reflective surfaces, brings great difficulties in pattern splicing adjustment.

It needs to be noted that the information disclosed in the background art above is only for an understanding of the background of the present application and thus may include information that does not constitute the prior art known to a person of ordinary skills in the art.

SUMMARY OF THE INVENTION

The main object of the present invention is to overcome the above-mentioned drawbacks of the background art and to provide a splicing projection device and method based on a reflective liquid crystal image modulator.

In order to achieve the above object, the present invention adopts the following technical solutions.

A splicing projection device based on a reflective liquid crystal image modulator, comprising a light source, first to second common beam splitting prisms, first to second polarizing beam splitting prisms, first to fourth LCOS chips, and an imaging lens;

wherein a light emitted by the light source is divided into a first beam of light and a second beam of light after passing through the first common beam splitting prism;

wherein the first beam of light forms transmission-propagated P-polarized light and reflection-propagated S-polarized light after passing through the first polarization beam splitting prism, the first LCOS chip modulates a part of a light of the P-polarized light into S-polarized light and then reflects same back to the first polarization beam splitting prism, and keeps the other part of the light of the P-polarized light as P-polarized light and reflects the same back to the first polarization beam splitting prism, and the second LCOS chip modulates a part of a light of the S-polarized light into P-polarized light and then reflects the same back to the first polarization beam splitting prism, and keeps the other part of the S-polarized light as S-polarized light and reflects the same back to the first polarization beam splitting prism; positions of the first LCOS chip and the second LCOS chip with respect to the first polarization beam splitting prism are such that S-polarized light reflected back by the first LCOS chip and P-polarized light reflected back by the second LCOS chip respectively pass through the first polarization beam splitting prism and are converted into first and second parallel image lights;

wherein the second beam of light forms transmission-propagated P-polarized light and reflection-propagated S-polarized light after passing through the second polarization beam splitting prism, the third LCOS chip modulates a part of a light of the P-polarized light into S-polarized light and then reflects the same back to the second polarization beam splitting prism, and keeps the other part of the light of the P-polarized light as P-polarized light and reflects the same back to the second polarization beam splitting prism, and the fourth LCOS chip modulates a part of a light of the S-polarized light into P-polarized light and then reflects the same back to the second polarization beam splitting prism, and keeps the other part of the light of the S-polarized light as S-polarized light and reflects the same back to the second polarization beam splitting prism, and positions of the third LCOS chip and the fourth LCOS chip relative to the second polarization beam splitting prism are such that the S-polarized light reflected back by the third LCOS chip and the P-polarized light reflected back by the fourth LCOS chip respectively pass through the second polarization beam splitting prism and are converted into third and fourth parallel image lights;

wherein the first and second parallel image lights transmit and propagate through the second common beam splitting prism, the third and fourth parallel image lights reflect and propagate through the second common beam splitting prism to form four parallel image lights, and after the four image lights pass through the imaging lens, a whole image composed of four parallel images is formed on a projection plane.

Further:

the four parallel images form a 2×2 array arrangement with no pixel overlapping between the four parallel images.

The four parallel images form a 2×2 array arrangement, and there is pixel overlapping between the four parallel images; a splicing overlapping region is present on the projection plane; and a splicing overlapping region is present between two adjacent parallel images, and there is a splicing overlapping region common to the four parallel images at a center.

Except the splicing overlapping region common to four parallel images, the splicing overlapping region between two adjacent parallel images is displayed according to 50% normal brightness of respective images; and the splicing overlapping region common to the four parallel images is displayed at one-fourth a normal brightness of respective images.

For multi-layer exposures for 3D printing applications, parallel images are displayed at the splicing overlapping region by taking turns corresponding to exposures of different layers, so that each layer maintains normal brightness at the splicing overlapping region.

A splicing projection device based on a reflective liquid crystal image modulator, comprising first to second light sources, a common beam splitting prism, first to second polarization beam splitting prisms, first to fourth LCOS chips and an imaging lens;

wherein the first to second light sources respectively emit a first beam of light and a second beam of light;

wherein the first beam of light forms transmission-propagated P-polarized light and reflection-propagated S-polarized light after passing through the first polarization beam splitting prism, the first LCOS chip modulates a part of a light of the P-polarized light into S-polarized light and then reflects same back to the first polarization beam splitting prism, and keeps the other part of the light of the P-polarized light as P-polarized light and reflects the same back to the first polarization beam splitting prism, and the second LCOS chip modulates a part of a light of the S-polarized light into P-polarized light and then reflects the same back to the first polarization beam splitting prism, and keeps the other part of the S-polarized light as S-polarized light and reflects the same back to the first polarization beam splitting prism; positions of the first LCOS chip and the second LCOS chip with respect to the first polarization beam splitting prism are such that S-polarized light reflected back by the first LCOS chip and P-polarized light reflected back by the second LCOS chip respectively pass through the first polarization beam splitting prism and are converted into first and second parallel image lights;

wherein the second beam of light forms transmission-propagated P-polarized light and reflection-propagated S-polarized light after passing through the second polarization beam splitting prism, the third LCOS chip modulates a part of a light of the P-polarized light into S-polarized light and then reflects the same back to the second polarization beam splitting prism, and keeps the other part of the light of the P-polarized light as P-polarized light and reflects the same back to the second polarization beam splitting prism, and the fourth LCOS chip modulates a part of a light of the S-polarized light into P-polarized light and then reflects the same back to the second polarization beam splitting prism, and keeps the other part of the light of the S-polarized light as S-polarized light and reflects the same back to the second polarization beam splitting prism, and positions of the third LCOS chip and the fourth LCOS chip relative to the second polarization beam splitting prism are such that the S-polarized light reflected back by the third LCOS chip and the P-polarized light reflected back by the fourth LCOS chip respectively pass through the second polarization beam splitting prism and are converted into third and fourth parallel image lights;

wherein the first and second parallel image lights transmit and propagate through the common beam splitting prism, the third and fourth parallel image lights reflect and propagate through the common beam splitting prism to form four parallel image lights, and after the four image lights pass through the imaging lens, a whole image composed of four parallel images is formed on a projection plane.

Further:

the four parallel images form a 2×2 array arrangement with no pixel overlapping between the four parallel images.

The four parallel images form a 2×2 array arrangement, and there is pixel overlapping between the four parallel images; a splicing overlapping region is present on the projection plane; and a splicing overlapping region is present between two adjacent parallel images, and there is a splicing overlapping region common to the four parallel images at a center.

Except the splicing overlapping region common to four parallel images, the splicing overlapping region between two adjacent parallel images is displayed according to 50% normal brightness of respective images; and the splicing overlapping region common to the four parallel images is displayed at one-fourth a normal brightness of respective images.

For multi-layer exposures for 3D printing applications, parallel images are displayed at the splicing overlapping region by taking turns corresponding to exposures of different layers, so that each layer maintains normal brightness at the splicing overlapping region.

A field-of-view splicing projection method based on a reflective liquid crystal image modulator, wherein a field-of-view splicing projection is performed by using the device.

The invention has beneficial effects as follows.

In a splicing projection device based on a reflective liquid crystal image modulator provided by the present invention, four parallel image lights modulated by first to fourth LCOS chips are formed by means of the optical path design of a light source, a common beam splitting prism, a first to a second polarization beam splitting prisms, a first to a fourth LCOS chips, and an imaging lens. The whole image is spliced on a projection plane; the optical path design of the splicing projection device avoids adding a reflector during the splicing process with respect to the prior art, and can realize the parallel image splicing of four chips and simplify the optical path structure; at the same time, it can avoid introducing more planar surface errors and bring great convenience for image splicing adjustment.

DETAILED DESCRIPTION OF THE INVENTION

Figure 1:
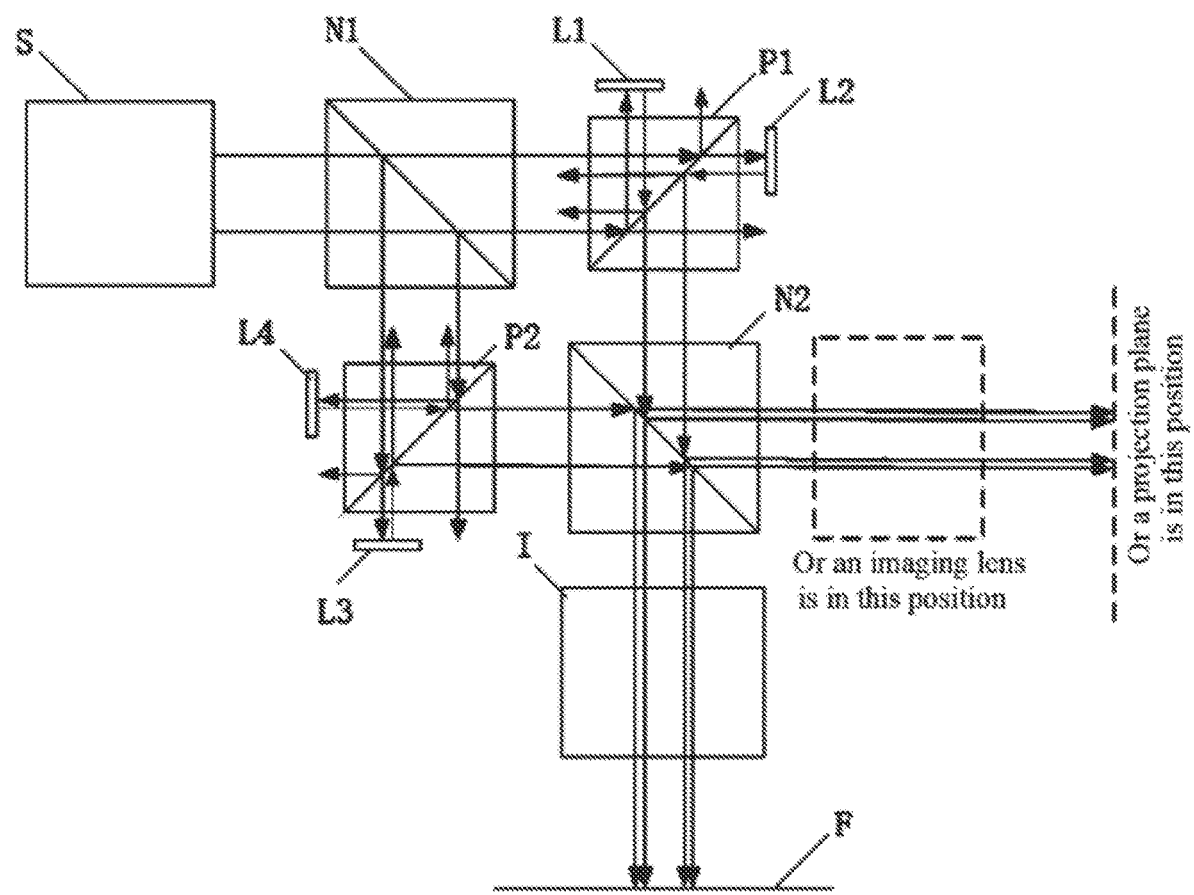
FIG. 1 is a schematic diagram showing an optical path structure of a splicing projection device based on a reflective liquid crystal image modulator according to an embodiment of the present invention.

Hereinafter, an implementation mode of the present invention will be described in detail. It should be emphasized that the following description is merely exemplary and is not intended to limit the scope or applications of the present invention.

It needs to be understood that when an element is referred to as being "fixed to" or "provided on" another element, it can be directly on the other element or indirectly on the other element. When one element is referred to as being "connected" to another element, it can be directly connected to the other element or indirectly connected to the other element. In addition, connections may be used for either fixing or coupling or communication.

It needs to be understood that the orientations or positional relationships indicated by the terms "length", "width", "up", "down", "front", "rear", "left", "right", "vertical", "horizontal", "top", "bottom", "inner", "outer" and the like are based on the orientations or positional relationships shown in the drawings for purposes of describing the embodiments of the present invention and simplifying the description only, and are not intended to indicate or imply that the referenced device or element must have a particular orientation or be constructed and operated in a particular orientation. It is therefore not to be understood as limiting the present invention.

Furthermore, the terms "first" and "second" are used for descriptive purposes only and are not to be construed as indicating or implying relative importance or implicitly indicating the number of technical features indicated. Therefore, features defining "first" and "second" may explicitly or implicitly include one or more such features. In the description of the embodiments of the present invention, the meaning of "a plurality" is two or more unless specifically defined otherwise.

Figure 2:
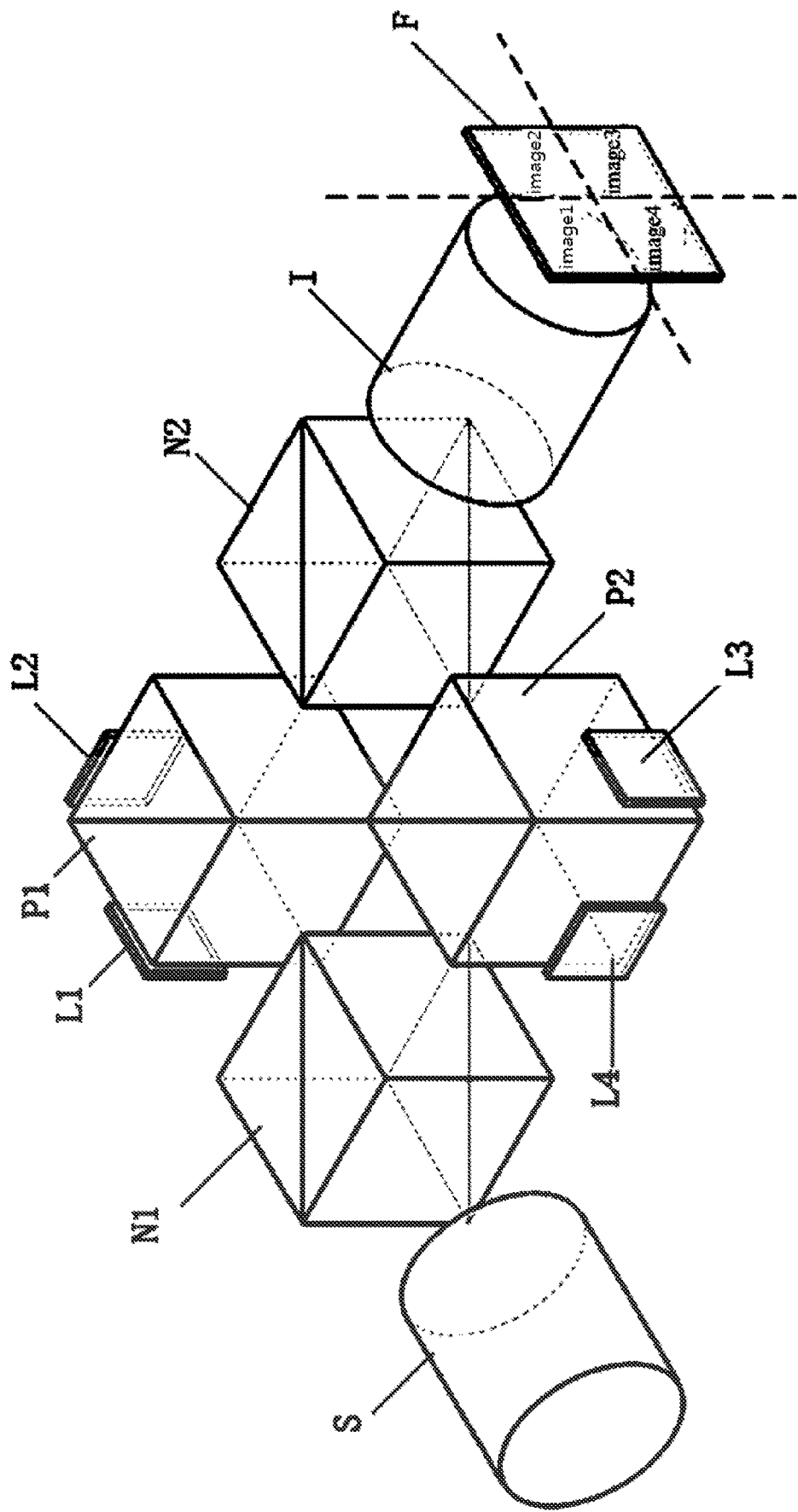
FIG. 2 is a schematic diagram of a stereostructure of a splicing projection device based on a reflective liquid crystal image modulator according to an embodiment of the present invention.

With reference to FIGS. 1 and 2, an embodiment of the present invention provides a splicing projection device based on a reflective liquid crystal image modulator, comprising a light source S, first to second common beam splitting prisms N1 and N2, first to second polarization beam splitting prisms P1 and P2, first to fourth LCOS chips L1, L2, L3, and L4, and an imaging lens I;

the light emitted by the light source S is divided into a first beam of light and a second beam of light after passing through the first common beam splitting prism P1;

the first beam of light forms transmission-propagated P-polarized light and reflection-propagated S-polarized light after passing through the first polarization beam splitting prism P1, the first LCOS chip L1 modulates a part of the light of the P-polarized light into S-polarized light and then reflects the same back to the first polarization beam splitting prism P1, and keeps the other part of the light of the P-polarized light as P-polarized light and reflects the same back to the first polarization beam splitting prism P1, and the second LCOS chip L2 modulates a part of the light of the S-polarized light into P-polarized light and then reflects the same back to the first polarization beam splitting prism P1, and reflects the other part of the S-polarized light as S-polarized light back to the first polarization beam splitting prism P1; the positions of the first LCOS chip L1 and the second LCOS chip L2 with respect to the first polarizing beam splitting prism P1 are such that the S-polarized light reflected back by the first LCOS chip L1 and the P-polarized light reflected back by the second LCOS chip L2 respectively pass through the first polarization beam splitting prism P1 and are converted into the first parallel image light and the second parallel image light;

the second beam of light forms transmission-propagated P-polarized light and reflection-propagated S-polarized light after passing through the second polarization beam splitting prism P2; the third LCOS chip L3 modulates a part of the light of the P-polarized light into S-polarized light and then reflects the same back to the second polarization beam splitting prism P2, and keeps the other part of the light of the P-polarized light as P-polarized light and reflects the same back to the second polarization beam splitting prism P2; and the fourth LCOS chip L4 modulates a part of the light of the S-polarized light into P-polarized light and then reflects the same back to the second polarization beam splitting prism P2, and keeps the other part of the S-polarized light as S-polarized light and reflects the same back to the second polarization beam splitting prism P2. The positions of the third LCOS chip L3 and the fourth LCOS chip L4 relative to the second polarization beam splitting prism P2 are such that the S-polarized light reflected back by the third LCOS chip L3 and the P-polarized light reflected back by the fourth LCOS chip L4 respectively pass through the second polarization beam splitting prism P2 and are converted into the third parallel image light and the fourth parallel image light;

the first and second parallel image lights transmit and propagate through the second common beam splitting prism N2, and the third and fourth parallel image lights reflect and propagate through the second common beam splitting prism N2 to form four parallel image lights, and after the four image lights pass through the imaging lens I, a whole image composed of four parallel images is formed on a projection plane F.

It is understood that when the first to fourth LCOS chips L1, L2, L3, and L4 receive P-polarized light or S-polarized light for modulation, a part of the pixels on the first to fourth LCOS chips reflect back P-polarized light, and the other part of the pixels reflect back S-polarized light.

In some embodiments, the first to fourth LCOS chips may use the same LCOS chip. Wherein the image signals input by each chip are controlled so that the second LCOS chip L2 and the first LCOS chip L1 are displayed in reverse colors; making the fourth LCOS chip L4 and the third LCOS chip L3 display in reverse colors; the first LCOS chip L1 and the fourth LCOS chip L4 display in the same color; and the second LCOS chip L2 and the third LCOS chip L3 display in the same color.

In other embodiments, the first to fourth LCOS chips can also use LCOS chips with different color displays. The first LCOS chip L1 and the second LCOS chip L2 are reverse-color display chips; the third LCOS chip L3 and the fourth LCOS chip L4 are reverse-color display chips; the first LCOS chip L1 and the fourth LCOS chip L4 are the-same-color display chips; and the second LCOS chip L2 and the third LCOS chip L3 are the-same-color display chips. In this case, the image signals inputted to the four chips may be homochromatic image signals.

In particular embodiments, the light source is preferably a uniform-light light source. The uniform-light light source may be a fly-eye lens uniform-light light source or a light guiding rod (integrating rod) uniform-light light source, or may be other uniform-light light sources.

Figure 3:
FIG. 3 is a schematic diagram of a splicing of four parallel images without overlapping produced by a splicing projection device based on a reflective liquid crystal image modulator according to an embodiment of the present invention.

As shown in FIG. 3, in some embodiments, the four parallel images form a 2×2 array arrangement with no pixel overlapping between the four parallel images.

Figure 4:
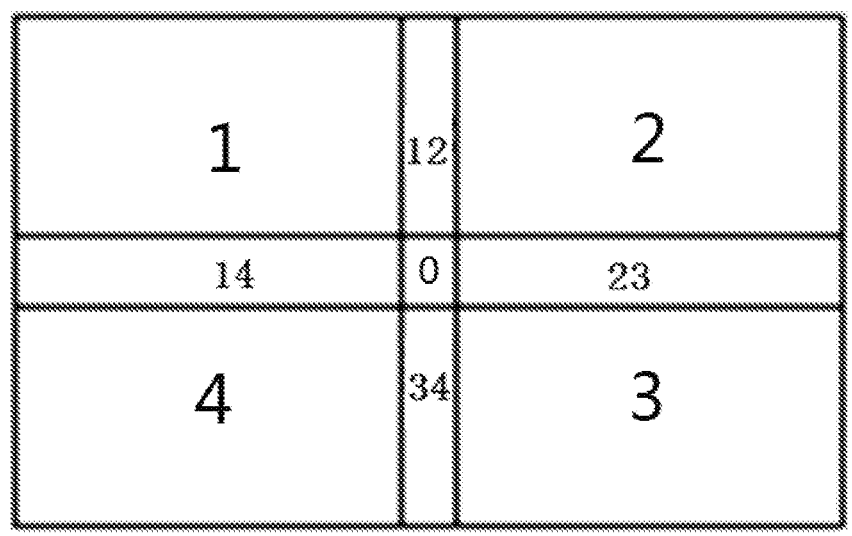
FIG. 4 is a schematic diagram of a splicing of four parallel images with spliced overlapping regions produced by a reflective liquid crystal image modulator based splicing projection device according to an embodiment of the present invention.

As shown in FIG. 4, in other embodiments, the four parallel images form a 2×2 array arrangement, and there is pixel overlapping between the four parallel images. A splicing overlapping region is present on the projection plane. A splicing overlapping region is present between two adjacent parallel images, and there is a splicing overlapping region common to the four parallel images at the center.

In a preferred embodiment, except the splicing overlapping region common to four parallel images, the splicing overlapping region between two adjacent parallel images is displayed according to 50% normal brightness of the respective images; and the splicing overlapping region common to the four parallel images is displayed at one-fourth the normal brightness of the respective images.

Specifically, with regard to a splicing overlapping region of two parallel images, a change calculation can be performed on the grey values of the two parallel images in the region, and the brightnesses of the two parallel images in the region can be controlled to reduce by half respectively; for a splicing overlapping region that is common to the four parallel images, change calculation can be performed on the grey values of the four parallel images in the region, and the brightness values of the four parallel images in the region can be controlled to decrease to one-fourth of the original value.

In a preferred embodiment, for multi-layer exposures for 3D printing applications, parallel images are displayed at the splicing overlapping region by turns to maintain the normal brightness of each layer at the splicing overlapping region, corresponding to the exposures of different layers.

For multi-layer exposure scenarios such as 3D printing applications, alternate exposure is applied to the splicing overlapping region. A region 1, a region 2, a region 3, and a region 4 are display regions of the first LCOS chip L1, the second LCOS chip L2, the third LCOS chip, and the fourth LCOS chip, respectively; a region 12, a region 14, a region 23, a region 34, and a region 0 are splicing regions of display regions of four chips. When exposing different layers, alternating working modes are used at the splicing overlapping region, namely: when the first LCOS chip L1 is fully projected, the regions 12, 14 and 0 are displayed on the first LCOS chip L1; the second LCOS chip L2, the third LCOS chip L3 and the fourth LCOS chip L4 do not display the region; the second LCOS chip L2 displays the region 23, the third LCOS chip L3 does not display the region 23, the third LCOS chip L3 displays the region 34, and the fourth LCOS chip L4 does not display the region 34; in the next image, the second LCOS chip L2 displays the full image, the third LCOS chip L3, the fourth LCOS chip L4, and the first LCOS chip L1 do not display the regions 23, 12 and 0, the third LCOS chip displays the region 34, the fourth LCOS chip does not display the region 34, the fourth LCOS chip displays the region 14, and the first LCOS chip L1 does not display the region 14, and so on. Other alternations may also be used to maintain the desired brightness of the display of each layer in the splicing overlapping region.

Figure 5:
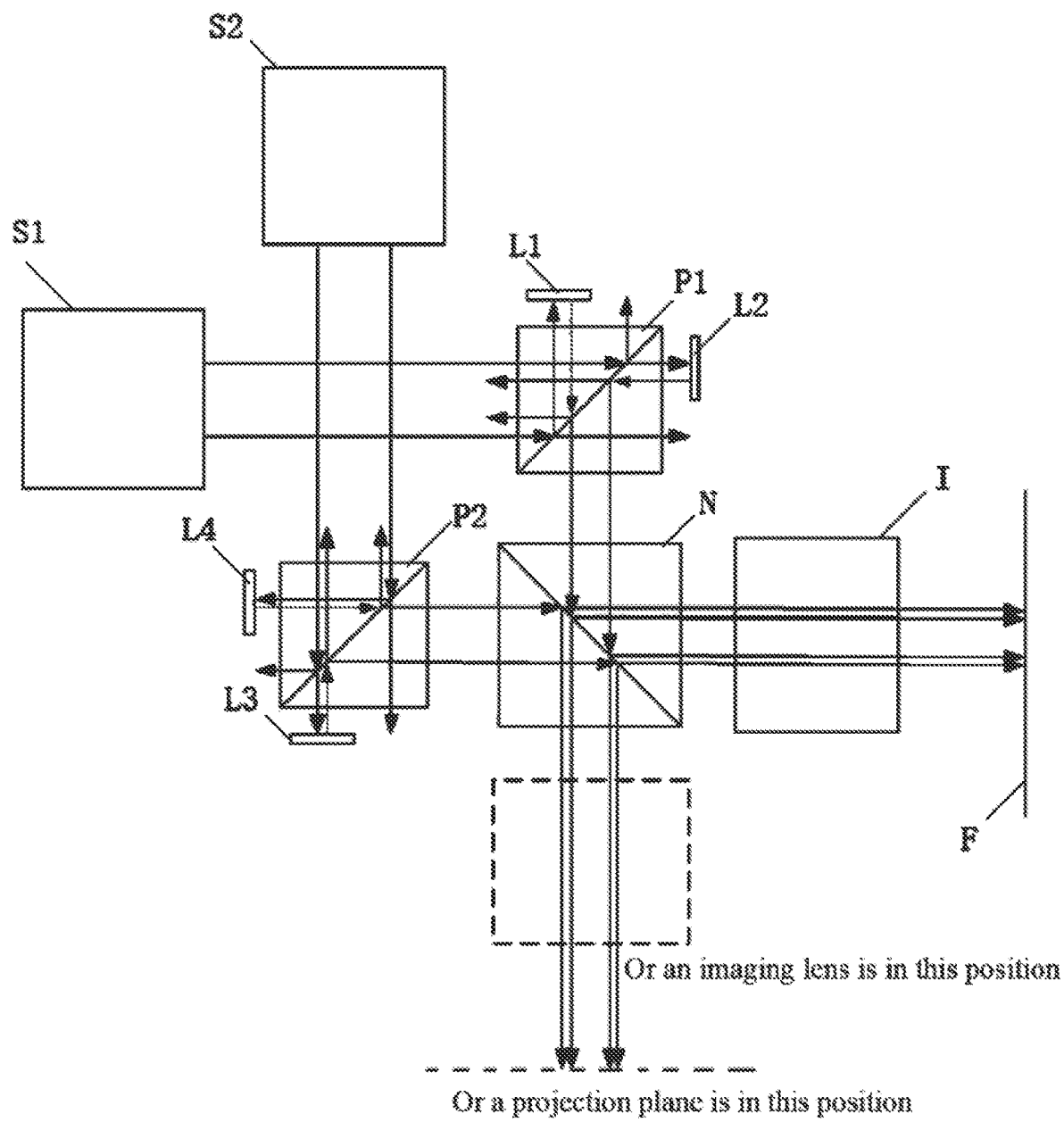
FIG. 5 is a schematic diagram showing an optical path structure of a splicing projection device based on a reflective liquid crystal image modulator according to another embodiment of the present invention.

Referring to FIG. 5, the present invention also provides a splicing projection device based on a reflective liquid crystal image modulator according to another embodiment, which differs from the splicing projection device according to the embodiments shown in FIGS. 1 and 2 in that: the former embodiment uses only one light source, but uses two common beam splitting prisms, wherein the light of the light source is divided into a first beam and a second beam by the first common beam splitting prism N1; however, the present embodiment comprises a first light source S1 and a second light source S2, wherein the first light source S1 and the second light source S2 directly emit a first light beam and a second light beam, and only one common beam splitting prism N is used. In this embodiment, two light sources are used to respectively irradiate the chips corresponding to the first polarization beam splitting prism P1 and the second polarization beam splitting prism P2. The advantage of separate irradiation is that the first light source is only used for the irradiation of the first LCOS chip and the second LCOS chip, and the second light source is only used for the irradiation of the third LCOS chip and the fourth LCOS chip, thereby avoiding the loss of the portion of the light split from the first common beam splitting prism that irradiates the second polarization beam splitting prism P2 but does not irradiate the third LCOS chip and the fourth LCOS chip, and the loss of the portion of the light split from the first common beam splitting prism that irradiates the first polarization beam splitting prism P1 but does not irradiate the first LCOS chip and the second LCOS chip in the case where the former embodiment uses two common beam splitting prisms.

In a splicing projection device based on a reflective liquid crystal image modulator provided by an embodiment of the present invention, four parallel image lights modulated by first to fourth LCOS chips are formed by means of the optical path design of one or two light sources, one or two common beam splitting prisms, a first to a second polarization beam splitting prisms, a first to a fourth LCOS chips, and an imaging lens. The whole image is spliced on a projection plane; the optical path design of the splicing projection device avoids the problem of adding a reflector during the splicing process with respect to the prior art, and can realize the parallel image splicing of four chips and simplify the optical path structure; at the same time, it can avoid introducing more planar surface errors and bring great convenience for image splicing adjustment.

The background section of the present invention may contain background information about the problems or circumstances of the present invention, not necessarily describing the prior art. Therefore, what is contained in the background section is not an admission by an applicant to the prior art.

The foregoing is a further detailed description of the invention in connection with specific/preferred implementation modes. It cannot be considered that the specific implementation of the present invention is limited to these descriptions. Without departing from the concept of the present invention, for those of ordinary skills in the technical field to which the present invention belongs, they can also make several substitutions or variants of these described implementation modes, and these substitutions or variants should be considered as belonging to the protection scope of the present invention. In the description of the present description, descriptions with reference to terms of "an embodiment", "some embodiments", "preferred embodiments", "example", "specific example" or "some examples" etc. mean that specific features, structures, materials, or characteristics described in conjunction with the embodiment or example are included in at least one embodiment or example of the present invention. In the present specification, schematic representations of the above terms do not necessarily refer to the same embodiments or examples. Furthermore, the specific features, structures, materials, or characteristics described may be combined in a suitable manner in any one or more embodiments or examples. Various embodiments or examples as well as features of various embodiments or examples described in the present specification may be incorporated and combined by those skilled in the art without mutual contradiction. Although embodiments of the present invention and their advantages have been described in detail, it should be understood that various changes, substitutions, and alterations can be made herein without departing from the scope of the patent application.

What is claimed is:

1. A splicing projection device based on a reflective liquid crystal image modulator, comprising a light source, a first to a second common beam splitting prisms, a first to a second polarization beam splitting prisms, a first to a fourth LCOS chips, and an imaging lens;
    wherein a light emitted by the light source is divided into a first beam of light and a second beam of light after passing through the first common beam splitting prism;
    wherein the first beam of light forms transmission-propagated P-polarized light and reflection-propagated S-polarized light after passing through the first polarization beam splitting prism, the first LCOS chip modulates a part of a light of the P-polarized light into S-polarized light and then reflects same back to the first polarization beam splitting prism, and keeps another part of the light of the P-polarized light as P-polarized light and reflects the same back to the first polarization beam splitting prism, and the second LCOS chip modulates a part of a light of the S-polarized light into P-polarized light and then reflects the same back to the first polarization beam splitting prism, and keeps another part of the S-polarized light as S-polarized light and reflects the same back to the first polarization beam splitting prism; positions of the first LCOS chip and the second LCOS chip with respect to the first polarization beam splitting prism are such that S-polarized light reflected back by the first LCOS chip and P-polarized light reflected back by the second LCOS chip respectively pass through the first polarization beam splitting prism and are converted into first and second parallel image lights;
    wherein the second beam of light forms transmission-propagated P-polarized light and reflection-propagated S-polarized light after passing through the second polarization beam splitting prism, the third LCOS chip modulates a part of a light of the P-polarized light into S-polarized light and then reflects the same back to the second polarization beam splitting prism, and keeps another part of the light of the P-polarized light as P-polarized light and reflects the same back to the second polarization beam splitting prism, and the fourth LCOS chip modulates a part of a light of the S-polarized light into P-polarized light and then reflects the same back to the second polarization beam splitting prism, and keeps another part of the light of the S-polarized light as S-polarized light and reflects the same back to the second polarization beam splitting prism, and positions of the third LCOS chip and the fourth LCOS chip relative to the second polarization beam splitting prism are such that the S-polarized light reflected back by the third LCOS chip and the P-polarized light reflected back by the fourth LCOS chip respectively pass through the second polarization beam splitting prism and are converted into third and fourth parallel image lights;
    wherein the first and second parallel image lights transmit and propagate through the second common beam splitting prism, the third and fourth parallel image lights reflect and propagate through the second common beam splitting prism to form four parallel image lights, and after the four image lights pass through the imaging lens, a whole image composed of four parallel images is formed on a projection plane.

2. The splicing projection device based on a reflective liquid crystal image modulator of claim 1, wherein the four parallel images form a 2×2 array arrangement with no pixel overlapping between the four parallel images.

3. The splicing projection device based on a reflective liquid crystal image modulator of claim 1, wherein the four parallel images form a 2×2 array arrangement, and there is pixel overlapping between the four parallel images; a splicing overlapping region is present on the projection plane; and a splicing overlapping region is present between two adjacent parallel images, and there is a splicing overlapping region common to the four parallel images at a center.

4. The splicing projection device based on a reflective liquid crystal image modulator of claim 3, wherein except the splicing overlapping region common to four parallel images, the splicing overlapping region between two adjacent parallel images is displayed according to 50% normal brightness of respective images; and the splicing overlapping region common to the four parallel images is displayed at one-fourth a normal brightness of respective images.

5. The splicing projection device based on a reflective liquid crystal image modulator of claim 3, wherein for multi-layer exposures for 3D printing applications, parallel images are displayed at the splicing overlapping region by taking turns corresponding to exposures of different layers, so that each layer maintains normal brightness at the splicing overlapping region.

6. A field-of-view splicing projection method based on a reflective liquid crystal image modulator, wherein a field-of-view splicing projection is performed by using the splicing projection device as claimed in claim 1.

7. A splicing projection device based on a reflective liquid crystal image modulator, comprising a first to a second light sources, a common beam splitting prism, a first to a second polarization beam splitting prisms, a first to a fourth LCOS chips and an imaging lens;
    wherein the first to second light sources respectively emit a first beam of light and a second beam of light;
    wherein the first beam of light forms transmission-propagated P-polarized light and reflection-propagated S-polarized light after passing through the first polarization beam splitting prism, the first LCOS chip modulates a part of a light of the P-polarized light into S-polarized light and then reflects same back to the first polarization beam splitting prism, and keeps another part of the light of the P-polarized light as P-polarized light and reflects the same back to the first polarization beam splitting prism, and the second LCOS chip modulates a part of a light of the S-polarized light into P-polarized light and then reflects the same back to the first polarization beam splitting prism, and keeps another part of the S-polarized light as S-polarized light and reflects the same back to the first polarization beam splitting prism; positions of the first LCOS chip and the second LCOS chip with respect to the first polarization beam splitting prism are such that S-polarized light reflected back by the first LCOS chip and P-polarized light reflected back by the second LCOS chip respectively pass through the first polarization beam splitting prism and are converted into first and second parallel image lights;
    wherein the second beam of light forms transmission-propagated P-polarized light and reflection-propagated S-polarized light after passing through the second polarization beam splitting prism, the third LCOS chip modulates a part of a light of the P-polarized light into S-polarized light and then reflects the same back to the second polarization beam splitting prism, and keeps another part of the light of the P-polarized light as P-polarized light and reflects the same back to the second polarization beam splitting prism, and the fourth LCOS chip modulates a part of a light of the S-polarized light into P-polarized light and then reflects the same back to the second polarization beam splitting prism, and keeps another part of the light of the S-polarized light as S-polarized light and reflects the same back to the second polarization beam splitting prism, and positions of the third LCOS chip and the fourth LCOS chip relative to the second polarization beam splitting prism are such that the S-polarized light reflected back by the third LCOS chip and the P-polarized light reflected back by the fourth LCOS chip respectively pass through the second polarization beam splitting prism and are converted into third and fourth parallel image lights;

wherein the first and second parallel image lights transmit and propagate through the common beam splitting prism, the third and fourth parallel image lights reflect and propagate through the common beam splitting prism to form four parallel image lights, and after the four image lights pass through the imaging lens, a whole image composed of four parallel images is formed on a projection plane.

8. The splicing projection device based on a reflective liquid crystal image modulator of claim 7, wherein the four parallel images form a 2×2 array arrangement, and there is no pixel overlapping between the four parallel images, or there is pixel overlapping between the four parallel images, and a splicing overlapping region exists on the projection plane, wherein a splicing overlapping region exists between two adjacent parallel images, and a splicing overlapping region common to the four parallel images exists at a center.

9. The splicing projection device based on a reflective liquid crystal image modulator of claim 8, wherein except the splicing overlapping region common to four parallel images, the splicing overlapping region between two adjacent parallel images is displayed according to 50% normal brightness of respective images; and the splicing overlapping region common to the four parallel images is displayed at one-fourth a normal brightness of respective images.

10. The splicing projection device based on a reflective liquid crystal image modulator of claim 8, wherein for multi-layer exposures for 3D printing applications, parallel images are displayed at the splicing overlapping region by taking turns corresponding to exposures of different layers, so that each layer maintains normal brightness at the splicing overlapping region.

11. A field-of-view splicing projection method based on a reflective liquid crystal image modulator, wherein a field-of-view splicing projection is performed by using the splicing projection device as claimed in claim 7.

* * * * *